(12) United States Patent
Walker

(10) Patent No.: US 6,455,012 B1
(45) Date of Patent: Sep. 24, 2002

(54) ACID GAS BURNER AND REACTOR APPARATUS AND METHOD

(75) Inventor: Lynn P. Walker, Sandy, UT (US)

(73) Assignee: S&B Engineers and Constructors, Ltd., Houston, TX (US)

(*) Notice: Subject to any disclaimer, the term of this patent is extended or adjusted under 35 U.S.C. 154(b) by 0 days.

(21) Appl. No.: 08/198,955

(22) Filed: Feb. 18, 1994

Related U.S. Application Data

(63) Continuation of application No. 07/947,557, filed on Sep. 21, 1992, now abandoned.

(51) Int. Cl.[7] .............................................. B01D 53/34
(52) U.S. Cl. ...................... 422/182; 422/160; 422/168; 422/176; 422/183; 431/186; 431/187; 431/174; 431/175
(58) Field of Search ................................. 422/168, 182, 422/183, 160, 176; 239/431, 563, 398; 431/186, 187, 174, 175

(56) References Cited

U.S. PATENT DOCUMENTS

| | | |
|---|---|---|
| 2,613,737 A | 10/1952 | Schweitert |
| 2,633,343 A | 3/1953 | Aghnides |
| 2,761,662 A | 9/1956 | Goodrie |
| 3,450,349 A | 6/1969 | Hamon |
| 3,782,884 A | 1/1974 | Shumaker |
| 4,070,146 A | 1/1978 | Straitz |
| 4,123,220 A | 10/1978 | Bond et al. |
| 4,492,562 A | 1/1985 | Michel |

*Primary Examiner*—Marian C. Knode
*Assistant Examiner*—Basia Ridley
(74) *Attorney, Agent, or Firm*—Mallinckrodt & Mallinckrodt; Philip A. Mallinckrodt

(57) ABSTRACT

An acid gas burner and reactor apparatus, and method when used in the Claus process, are improved over the prior art by the provision of a substantially continuous circular slot for the flow of a reactant gas from an annular conduit into the open outflow end of a conduit that is located centrally of the annular conduit and through which flows pressure air, or air enriched with oxygen, the circular slot surrounding the open discharge end of the central conduit so as to discharge an annular curtain of the reactant gas into the flow of pressure air, or oxygen enriched air.

6 Claims, 2 Drawing Sheets

ACID GAS BURNER AND REACTOR APPARATUS AND METHOD

Figure 1:
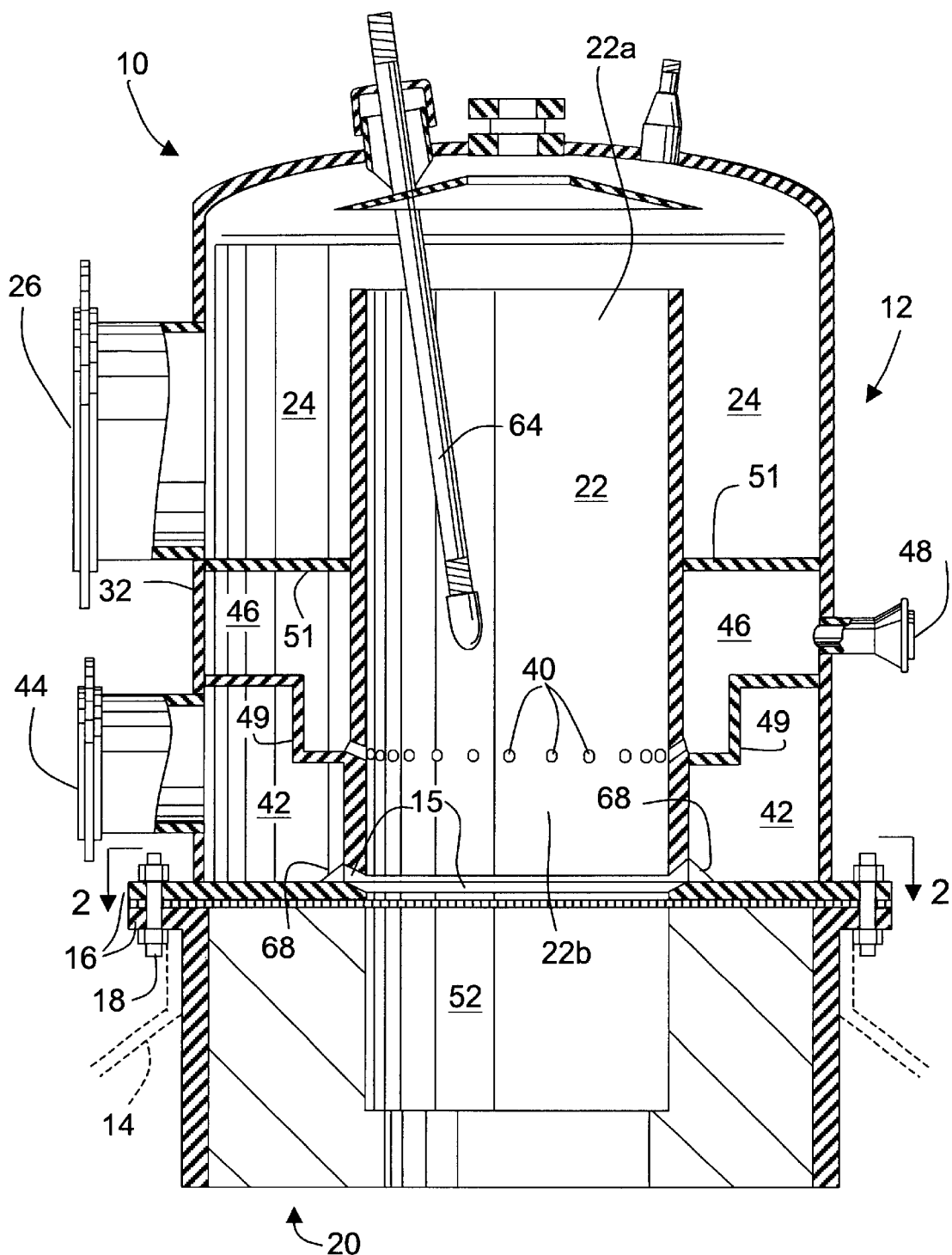

This is a [X] continuation, of application Ser. No. 07/947,557, filed Sep. 21, 1992 now abandoned.

BACKGROUND OF THE INVENTION

1. Field

The invention relates to the type of acid gas burner and reactor apparatus shown in Shumaker U.S. Pat. No. 3,782,884 of Jan. 1, 1974 as improved by Desmond H. Bond et al. in accordance with U.S. Pat. No. 3,963,443 of Jun. 15, 1976, both of these sets of apparatus intended primarily for use in connection with practice of the well-known Claus process for producing elemental sulfur from hydrogen sulfide gas. State

2. State of the Art

The Claus process was developed in Germany many years ago and has been used throughout the world for extracting sulfur from hydrogen sulfide ($H_2S$) effluent gases to both recover elemental sulfur therefrom and reduce the atmospheric polluting character of such gases.

In carrying out'the process, the $H_2S$ gas, air, and fuel gas, are fed into the burner part of'the apparatus for combustion at a very high temperature in a reaction chamber part of the apparatus such that one-third of the volume of the acid feed gas is converted into sulfur dioxide ($SO_2$). The products of combustion are normally passed through a catalyst to effect the following reaction:

$$2H_2S+SO_2=3S+2H_2O.$$

However, close flow control and metering of the reactants and thorough mixing thereof prior to and during combustion are very important procedural considerations in practice of the process. Accordingly, prime structural features of acid gas burner and reactor apparatus for the purpose have been those ensuring maximum flow control and effective mixing of the reactants as they pass through the burner into the reaction chamber.

The Bond et al. acid gas burner and reactor apparatus, as produced and sold by an affiliate of the engineering firm of Ford, Bacon & Davis, Dallas, Tex., was a significant improvement on earlier acid gas burner and reactor apparatus, including the Shumaker acid gas burner and reactor apparatus, and has been used throughout the world primarily in connection with practice of the Claus process.

The Bond et al. acid gas burner and reactor apparatus improved the earlier acid gas burner and reactor apparatus and was eminently successful because it fed a multitude of jets of the hydrogen sulfide gas into a centrally flowing stream of air from a surrounding annular stream of the gas through a corresponding multitude of so-called nozzle apertures arranged in a series of annular rows extending along the streams of air and gas. Superior mixing of the gas with the air for the Claus reaction was obtained and certain difficulties, brought about by the Shumaker and earlier constructions, were overcome. Thus, Shumaker's burner tube cap,. that was adjustable closer to or farther away from the open discharge end of the $H_2S$-gas-carrying conduit by means of a longitudinally movable shaft carrying such cap at one of its ends, to provide a size adjustable, annular slot as a discharge opening leading into a surrounding flow of air for metering and controlling the quantity of $H_2S$ gas being mixed with air as it discharges into the reaction chamber of the apparatus, was replaced by longitudinally successive, circular rows of jet openings, each such row being in the form of a multitude of closely spaced and relatively small nozzle apertures leading, contrary to Shumaker, into a centralized flow of air from a surrounding flow of the $H_2S$ gas.

SUMMARY OF THE PRESENT INVENTION

I have developed an acid gas burner and reaction apparatus that is an improvement over both the earlier Shumaker apparatus and the later Bond et al. apparatus in that it provides greater versatility in flow rates, while insuring: better mixing; that it substantially eliminates or at least minimizes unwanted side reactions of $SO_3$ with other components, such as ammonia, which produce heat stable salts tending to plug downstream equipment; and that it thereby achieves longer on-stream time, produces a higher ratio of acid gas to oxidant gas, permits better control of the ratio of these two gases over a wide flow range, decreases maintenance expense, makes for higher recovery of sulfur accompanied by fewer emissions, and achieves cost savings in manufacture of the apparatus.

I have found that retaining an annular curtain flow of the $H_2S$ gas into the airstream, according to Shumaker and earlier forms of acid gas burners, rather than the Bond et al. multiple jet flows from circular rows of nozzle apertures, but retaining the Bond et al. arrangement of flowing the $H_2S$ gas into a centralized flow of air from a surrounding annular stream of the gas, achieves the advantageous results sought. The teachings of the prior art actually lead away from anyone skilled in the art doing what I did in accordance with this present invention.

Thus, my invention principally resides in replacing Bond et al.'s concentric circular rows of nozzle apertures, for producing jets of the $H_2S$ gas feeding into the reaction chamber of the apparatus, with the very thing that Bond et al. had earlier so successfully replaced, namely the circular slot that produces annular flow of the $H_2S$ gas as in the Shumaker and earlier prior art patents. To do this, I have modified the Bond et al. construction as is herein shown and described.

THE DRAWINGS

The embodiment of acid gas burner and reactor apparatus illustrated in the accompanying drawings represents the best mode presently contemplated of carrying out the invention in actual practice.

Figure 2:
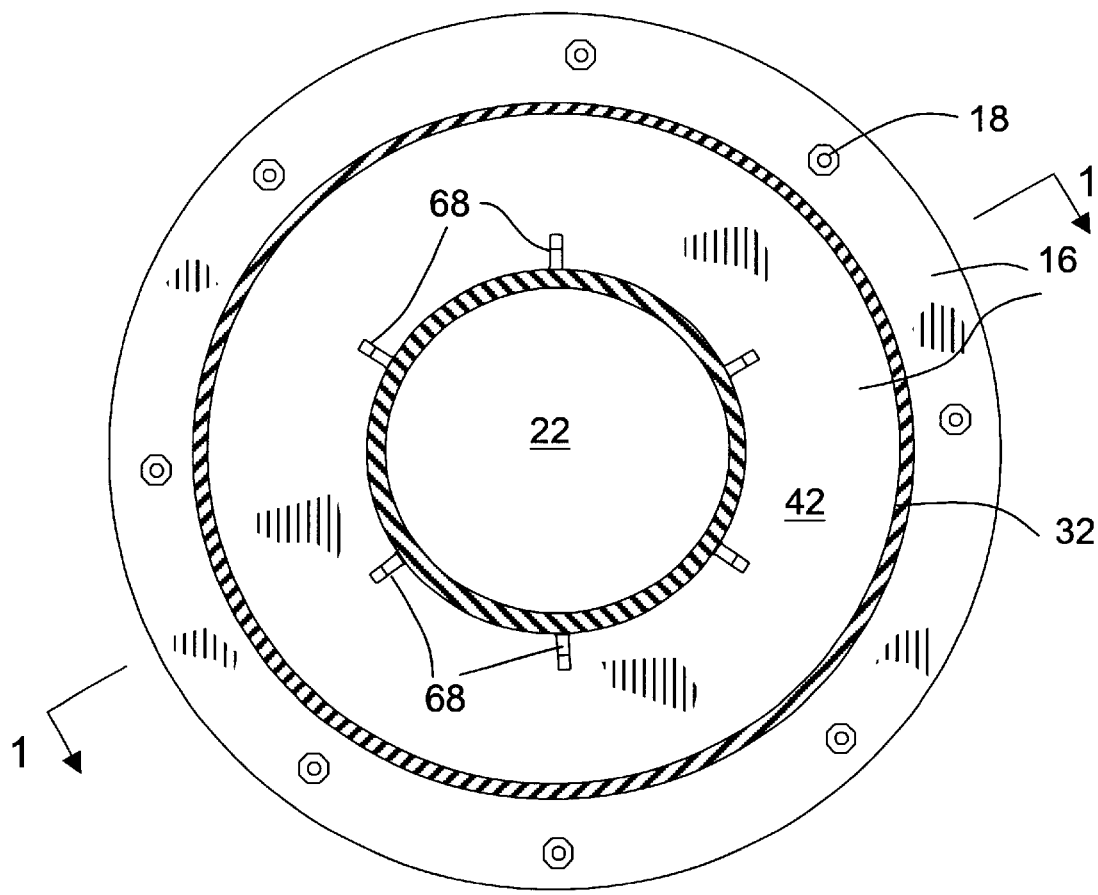

In these drawings:

FIG. 1 is a somewhat schematic, axial, vertical section taken on the line 1—1 of FIG. 2 through the burner and reactor parts of apparatus which incorporate the invention; and FIG. 2, a transverse vertical section taken on the line 2—2 of FIG. 1.

DETAILED DESCRIPTION OF THE ILLUSTRATED EMBODIMENT

The apparatus of the invention is preferably similar in general to that of the afore-referred-to Bond et al. patent and is here illustrated as in that patent, except as modified in accordance with the present improved construction, parts herein described that are similar to those shown in the Bond et al. patent being identified by the same reference characters.

Accordingly, the burner part 12 of the combination apparatus 10 as shown by Bond et al. is fastened to a furnace 14 by means of sets of respective flanges 16 and bolts 18, and the reaction chamber part 20 of refractory material is supported by the furnace wall in axial alignment with the burner part 12.

Here, however, instead of $H_2S$ gas being fed into the air stream through a longitudinal series of concentric annular rows of nozzle apertures formed in the outlet end portion of burner part 12 of the apparatus 10 to provide jet-forming discharge openings, prior to communication of such burner part 12 with the reactor chamber part 20 of furnace 14, leading from a surrounding flow of the $H_2S$ gas through an annular conduit 42 that surrounds a centralized flow of air within an open-ended, rectilinear conduit 22 as in Bond et al., the outlet end portion of burner part 12 terminates short of reactor chamber part 20 to replace, such series of annular rows of nozzle apertures by a single continuous annular slot therebetween, here identified 15, which provides a curtain flow of $H_2S$ gas that is substantially continuously annular much as in the Shumaker patent.

This structural modification and rearrangement of the prior art, and particularly of the Bond et al. acid gas burner and reactor apparatus that had come to be accepted as standard in the art, achieves greater flow control and more effective mixing of the reactants than had heretofore been thought possible.

As in the Bond et al. construction, the centralized air flow conduit 22 is preferably rectilinearly elongate, as illustrated, having an open inflow end 22a for air that is usually oxygen enriched and supplied from any suitable source through inflow port 26 by way of an annular air flow manifold 24 as formed between the exterior casing, here indicated 32, of the apparatus and the air flow conduit 22.

The $H_2S$ gas is supplied to the annular slot 15 from a gas inlet port 44 by way of an annular gas flow manifold 42 that circumferentially surrounds the open outflow end portion of air flow conduit 22 and is formed between such outflow end portion of conduit 22 and a discharge end portion of exterior casing 32. Gas flow manifold 42 leads directly to annular slot 15, communicating therewith circumferentially throughout and being interrupted only by ribs 68 that serve to structurally interconnect burner part 12 of the apparatus 10 with the furnace 14 and reactor part 20 thereof outside of slot 15 and so spaced and narrow as to not significantly inhibit gas flow, see especially FIG. 2.

As in Bond et al., a circle of nozzle apertures 40 is supplied with fuel gas from a fuel gas manifold 46 and a fuel gas inlet port 48 as may be found desirable, and a pilot burner 64 is provided for ignition purposes. Here, transverse annular walls 49 and 51 define fuel gas manifold 46 and divide air flow manifold 24 from gas flow manifold 42.

In operation, air or oxygen-enriched air under pressure is supplied through inflow port 26 and flows through annular air flow manifold 24 into the open inflow end 22a of air flow conduit 22 and through such air flow conduit to the opposite, open, outflow end 22b thereof. At such opposite outflow end 22b, a substantially continuous annular curtain of $H_2S$ gas merges with the centralized flow of air or oxygen enriched air by passing through continuous annular slot 15 from annular gas flow manifold passage 42 that surrounds air flow conduit 22. The mixed flow of air, $H_2S$ gas, and fuel gas is ignited as by pilot burner 64 and burns at the usual high temperature as it continues on through the reaction chamber 52 of the reaction part 20 of the burner/reaction apparatus 10.

Whereas this invention is here illustrated and described with reference 'to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. An improved processing apparatus, comprising a burner part and a separate processing part extending and interconnected substantially rectilinearly so that said burner part discharges into said processing part, said burner part comprising an elongate gas flow conduit having an open inflow end and an open outflow end which is arranged to discharge gas into said processing part and said processing part comprising a gas flow conduit having an open inflow end; an annular flow manifold for an input gas adjacent to and surrounding an outflow end portion of said gas flow conduit of the burner part, said annular flow manifold and said gas flow conduit of the burner part defining with said open inflow end of the gas flow conduit of the processing part and therebetween a single, continuous, annular slot at said open inflow end of said gas flow conduit of said processing part for discharge of said input gas into flow of gas discharging into said processing part from said outflow end of said gas flow conduit of said burner part, said slot being the sole flow communication between said manifold and said gas flow conduit of said processing part and constituting spacing between said outflow end of said gas flow conduit of the burner part and said open inflow end of the gas flow conduit of said processing part; structural means securing said burner part and said processing part together at, but outside of, said slot substantially without inhibiting flow of gas through said slot, whereby a substantially continuous, annular curtain of said inflow gas is directed into said flow of gas passing from said gas flow conduit of said burner part into said gas flow conduit of said processing part; means for flowing gas into the inflow end of said gas flow conduit of the burner part; means for flowing an input gas into said annular flow manifold; means for flowing a fuel gas into said gas flow conduit of the burner part; and means for igniting the flowing gas passing from said gas flow conduit of said burner part into said gas flow conduit of said processing part for burning within said processing part of the apparatus.

2. The improved apparatus of claim 1, wherein the structural means securing the burner part and the processing part together comprise ribs that are so widely spaced and narrow as to not significantly inhibit gas flow through said slot.

3. The improved apparatus of claim 1, wherein the means for flowing an input gas into the annular flow manifold flows $H_2S$ gas thereinto, whereby said apparatus, in operation, carries out the Claus process for converting $H_2S$ gas into elemental sulfer.

4. An improved acid gas burner and reaction apparatus, comprising a burner part and a reactor part extending and interconnected substantially rectilinearly so that said burner part discharges into said reactor part through an entrance, said burner part comprising an elongate air flow conduit having an open inflow end and an open outflow end which is arranged to discharge into said reactor part; an annular flow manifold for a reactant gas adjacent to and surrounding an outflow end portion of said air flow conduit, said annular flow manifold and said air flow conduit defining a single, continuous, annular slot adjacent to the entrance of said reactor part for discharge of said reactant gas into flow of gas discharging into said reactor part from said outflow end of said air flow conduit, said slot being the sole flow communication between said manifold and said air flow conduit; structural means securing said air flow conduit and said annular flow manifold together at, but outside of, said slot substantially without inhibiting flow of gas through said slot, whereby a substantially continuous, annular curtain of reactant gas is directed into said flow of gas passing from said air flow conduit into said reactor part; means for flowing air or oxygen enriched air into the inflow end of said air flow conduit; means for flowing a reactant gas into said annular flow manifold; means for flowing a fuel gas into said air flow conduit; and means for igniting the flowing gas passing from said gas flow conduit into said reactor part for burning within said reactor part of the apparatus.

5. The improved apparatus of claim 4, wherein the structural means securing the air flow conduit and the annular flow manifold together comprise ribs that are so widely spaced and narrow as to not significantly inhibit gas flow through said slot.

6. The improved apparatus of claim 4, wherein the means for flowing a reactant gas into the annular flow manifold flows $H_2S$ gas thereinto, whereby said apparatus, in operation, carries out the Claus process for converting $H_2S$ gas into elemental sulfur.

* * * * *